Nov. 18, 1958 J. J. ZIMMERMANN 2,861,126
TELEPHONE ANSWERING EQUIPMENT ACTUATING DEVICE
Filed Oct. 12, 1953
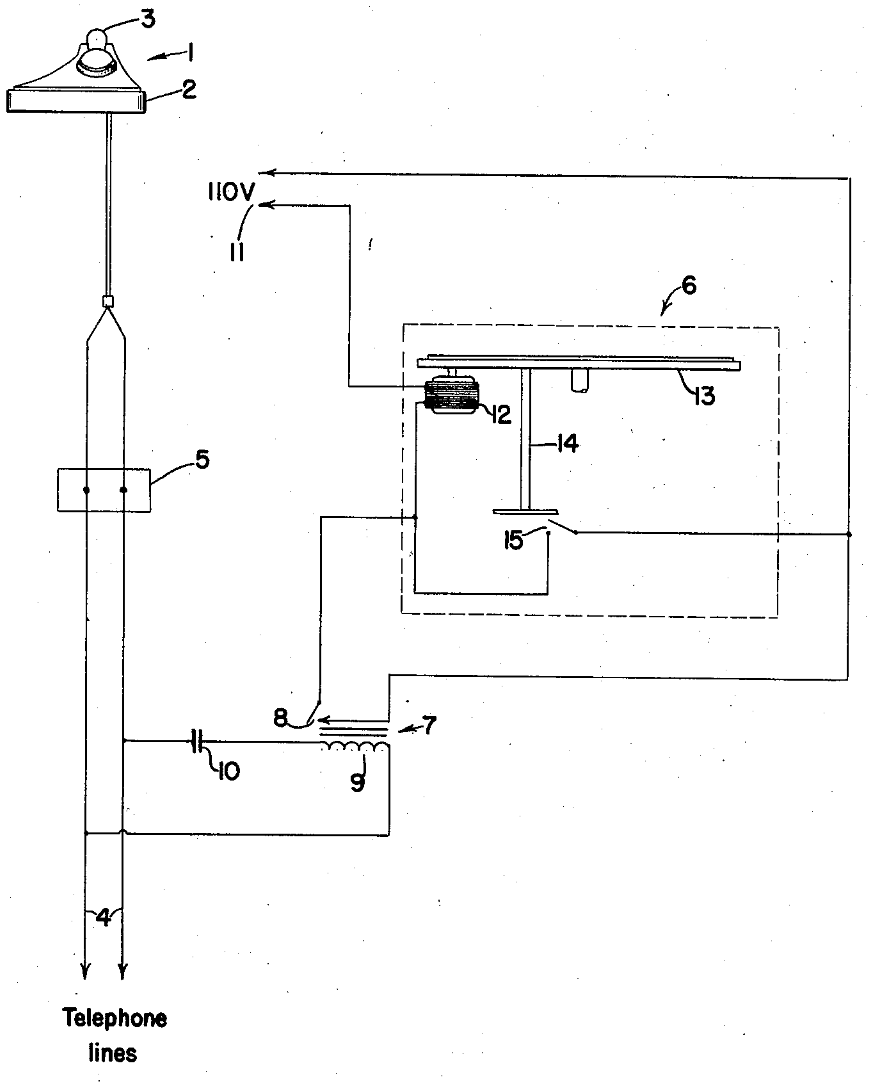
*INVENTOR.*
JOSEPH J. ZIMMERMANN
*BY* Andrus & Sceales
Attorneys United States Patent Office 2,861,126

Patented Nov. 18, 1958

2,861,126

TELEPHONE ANSWERING EQUIPMENT ACTUATING DEVICE

Joseph J. Zimmermann, Milwaukee, Wis., assignor to Electronic Secretary Industries, Inc., Waukesha, Wis., a corporation of Wisconsin Application October 12, 1953, Serial No. 385,427

4 Claims. (Cl. 179—6)

This invention relates to an actuating device for initiating the operation of telephone answering equipment.

The conventional telephone answering device which is connected in the telephone line for initiating the operation of the answering device is unsuitable for party line systems. In party line systems a form of harmonic ringing is normally employed in which the different telephones connected to one line are provided with bell units that only respond to ringing currents of a selected frequency; each telephone bell unit responding to a different frequency from the others. Although the bells respond to only one frequency, current flows through the bell windings at all frequencies. If the conventional telephone answering device is connected directly in the line, the device answers the telephone at any of the frequencies even though the call is not directed to the telephone with which the device is associated.

Although harmonic signaling devices have been disclosed which permit the telephone operator at a central station to control the actuation of the telephone answering equipment, they are not directed to party line systems and are not entirely satisfactory for the modern dial systems.

As disclosed in Patent 2,332,352, issued to N. R. Van Deventer on October 19, 1943, one such device employs a frequency selective relay which is responsive to signaling frequencies different from the signaling frequency employed with the telephone with which the answering equipment is associated. This device would be unsatisfactory, as when the operator energized the relay one of the other telephones on the party line would ring. Further, the operation of this system requires a central operator and is not adapted to the present day dial system.

Another similar device, disclosed in the above noted reference, is controlled by a central operator and employs a switching mechanism actuated by the vibrating arm of the bell unit of the telephone. The switching mechanism controls energization of a relay which in turn controls energization of a thermal delay relay. The latter relay actuates the answering equipment after a predetermined period of energization. The operator rings the telephone for a predetermined period, after which the calling party is informed, by the operator, of the answering device and asked if he wishes to leave a message. If the calling party wishes to leave a message, the operator rings the telephone for another predetermined period of time after which the thermal relay actuates the answering device. If employed with an automatic dial system, the calling party would often hang up before the answering device was actuated. Further, in this latter device, the telephone construction is changed. In many telephone companies, the telephones are merely leased to the subscriber and the subscriber would have no right to make the necessary changes therein.

Acoustical pickups which would avoid the above difficulties are generally unsatisfactory when compared with a conductive or inductive connection because of the difficulties arising from extraneous noises and the like.

The present invention is based upon the concept of employing a frequency sensitive relay which is immediately and only responsive to the ringing frequency for the telephone with which it is associated.

More particularly, the present invention employs a frequency sensitive relay having its winding connected across the telephone lines. The relay contacts are connected in circuit with a telephone answering device such that the device begins to operate when the contacts are closed. When a ringing current flows, corresponding to the frequency for actuation of the bell of the telephone with which the answering device is associated, the frequency sensitive relay closes its contacts and initiates operation of the answering device. A holding circuit within the telephone answering device permits continued operation of the device after the ringing current is discontinued.

The drawing furnished herewith illustrates the best mode presently contemplated of carrying out the invention as set forth hereinafter.

In the drawing, there is illustrated a schematic diagram of the invention.

For purposes of illustration the telephone 1 is shown as a standard desk set having a base 2 and a hand set 3. The telephone 1 is connected across the telephone lines 4 in the conventional manner such as telephone line block 5.

Connected across telephone lines 4 are a plurality of telephones establishing a conventional party line system. Only telephone 1 is shown and described as it is deemed sufficient for a full and complete understanding of the present invention.

Harmonic ringing is normally employed in a party line system with four frequencies: 16⅔, 33⅓, 50 and 66⅔ cycles, respectively, usually provided for signaling purposes. With the above frequencies, four different telephones would be connected across the line and each provided with audible signaling means actuated by one of the above frequencies, different from the other frequencies.

As in the conventional telephone, the telephone 1 is normally provided with a bell unit (not shown) which is responsive to a definite selected frequency and it is the only telephone in the party line controlled by that frequency. The bell unit in a desk type telephone, as illustrated in the drawing, is normally housed within the base 2.

Associated with the telephone 1 is an automatic telephone answering device 6 which, for purposes of illustration, is shown as being similar to the disclosure of applicant's pending application entitled "Close Coupled Telephone Answering and Message Recording Device," Serial No. 223,730, filed April 30, 1951. The telephone answering device 6 is shown diagrammatically with only the connecting elements necessary for a full and complete understanding of the invention illustrated.

To actuate the telephone answering device 6, a frequency sensitive relay 7 connects the device in circuit with the telephone lines 4, as subsequently described. The relay 7 is an alternating current relay of a conventional variety which actuates its contacts 8 in response to a current flow of only one predetermined frequency in its winding 9. In the present invention, the relay 7 is selected such that it responds only to a current of the frequency operable to ring the bell unit (not shown) of the telephone 1. In this manner, actuation of the answering device 6 is restricted to ringing current flow in the telephone lines for the telephone with which the device is associated.

The winding 9 of relay 7 is connected, in series with a condenser 10, across the telephone lines 4. The ringing currents of various frequencies for the telephones connected in circuit with the telephone lines all flow in the winding 9. Of the various ringing currents flowing in winding 9, only the current operable to ring the bell unit (not shown) of the telephone 1 actuates the relay 7 to close the contacts 8, as described above.

The condenser 10 is inserted in the circuit to block the flow of direct current through the winding 9.

Although the winding 9 is illustrated as conductively connected across the telephone lines, it may be inductively connected thereto within the scope of the present invention.

The contacts 8 of relay 7 are connected in series with a source of power 11 and a motor 12 of the answering device 6. As more clearly set forth in the previously referred to application, the motor 12 is adapted to operate a phonograph turntable 13 which in turn through a suitable clutch mechanism (not shown) causes the pin 14 to drop and close switch 15. The switch 15 completes a holding circuit around relay 7 and permits continued operation of the answering device after the cessation of the ringing current. The telephone answering device 6 completes a cycle of operation after which the clutch mechanism raises the pin 14, permitting switch 15 to open and automatically disconnect the telephone answering device 6.

For purposes of describing the operation of the above embodiment of the invention assume the telephone 1 is connected in a party line with the four signaling frequencies—16⅔, 33⅓, 50 and 66⅔ cycles respectively and that 16⅔ cycles actuates the ringer of telephone 1. The frequency responsive relay 7 is therefore constructed to respond to only a frequency of 16⅔ cycles.

When any of the above ringing currents is sent over the telephone lines 4, it flows through winding 9 which in effect discriminates between the various frequencies and selects the 16⅔ cycle current to close the contacts 8.

When the contacts 8 close, the motor 12 is energized and starts the telephone answering device 6. The answering device 6 has a built in holding circuit, as previously described, which permits a cycle of operation independently of the 16⅔ cycles ringing current.

Although the other frequencies of 33⅓, 50 and 66⅔ also flow in winding 9, they are not operative to close the contacts 8.

The present invention presents a simply constructed and economical device for controlling telephone answering apparatus in party line systems. The invention provides an immediate response to incoming callers which is completely automatic.

Various modes of carrying out the invention may be employed within the scope of the accompanying claims which particularly point out and distinctly set forth the subject matter regarded as the invention.

I claim:

1. In an actuating device for telephone answering equipment associated with a party line telephone having a harmonic ringer energized by a signal current of selected frequency different than the frequency of other telephones on the same party line, frequency sensitive means responsive to the frequency of the harmonic ringer, circuit means connecting said frequency sensitive means with the telephone answering equipment to control said telephone answering equipment in response to energization of said frequency sensitive means, and circuit means connecting said frequency sensitive means to the telephone lines of said telephone, said construction automatically operating to initiate actuation of the telephone answering equipment in response to a normal energization of the harmonic ringer.

2. In a device for initiating operation of a telephone answering apparatus operably connected with a party line telephone having a signaling current of a normal single and exclusive frequency, relay contacts connected in the energization circuit of said telephone answering apparatus and adapted to start the apparatus in operation when closed, a frequency sensitive relay winding disposed to control said relay contacts and being connected across the telephone lines of said telephone, said winding being responsive to a normal signaling current and only to said signaling current to close said relay contacts, and a condenser in series connection with said winding to prevent the flow of direct current through said winding.

3. In an actuating device for telephone answering equipment operably connected with a party line telephone having a harmonic ringer energized by an exclusive frequency ringing current, a single-frequency responsive relay operated by a current of the frequency for operating said harmonic ringer, and a condenser connected in series with the winding of said relay, said series connected condenser and relay being conductively connected across the telephone lines for said party line telephone to effect an energization of the relay by an incoming ringing signal, the contacts of said relay being connected in series with said telephone answering equipment and a source of power for said telephone answering equipment to actuate said equipment in response to energization of said relay by a normal ringing current.

4. In combination, a telephone answering device having a motor actuated phonograph operable to maintain operation of said device after initial actuation of the phonograph, a party line telephone operably connected with said telephone answering device, said telephone having a harmonic ringer responsive to a single-frequency current, a frequency sensitive relay responsive only to current of the frequency of said harmonic ringer, the contacts of said relay being connected in series with a source of power and the motor of said phonograph, a winding of said relay being connected across incoming telephone lines for said telephone and energized by the normal ringing current for said telephone, and a condenser in series connection with said winding to prevent direct current flow therethrough, said construction initiating the operation of said telephone answering device in response to the normal ringing current for said telephone.

References Cited in the file of this patent

UNITED STATES PATENTS

| | | |
|---|---|---|
| 1,933,680 | Ohl | Nov. 7, 1933 |
| 2,332,359 | Van Deventer | Oct. 1, 1943 |
| 2,476,327 | Silvermaster | July 19, 1949 |

UNITED STATES PATENT OFFICE

CERTIFICATE OF CORRECTION atent No. 2,861,126 November 18, 1958

Joseph J. Zimmermann

It is hereby certified that error appears in the printed specification of the above numbered patent requiring correction and that the said Letters Patent should read as corrected below.

Column 4, line 12, strike out "normal" and insert the same before signaling", same line.

Signed and sealed this 24th day of March 1959.

(SEAL)
Attest:

ARL H. AXLINE
Attesting Officer

ROBERT C. WATSON
Commissioner of Patents